INVENTOR.
Paul F. Shaeffer
BY
HIS ATTORNEY

INVENTOR.
Paul F. Shaeffer
BY Carl A. Stickel
HIS ATTORNEY

INVENTOR.
Paul F. Shaeffer
BY Carl A. Stickel
HIS ATTORNEY

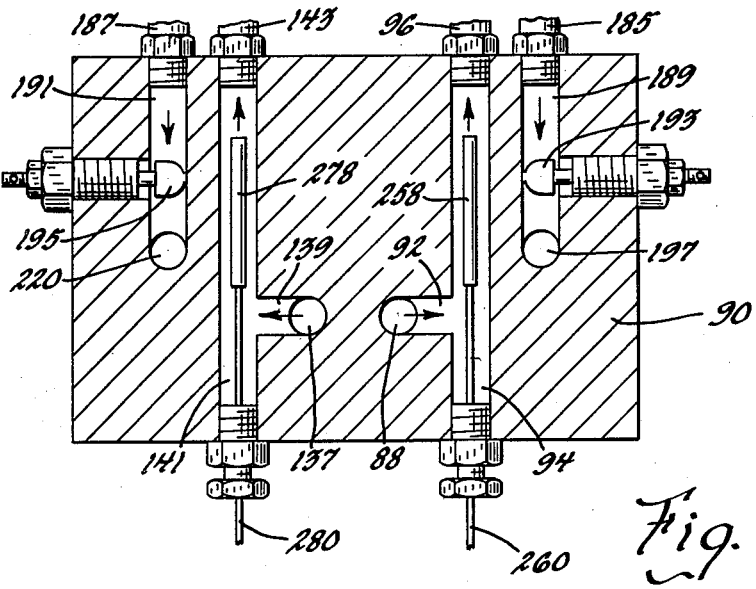
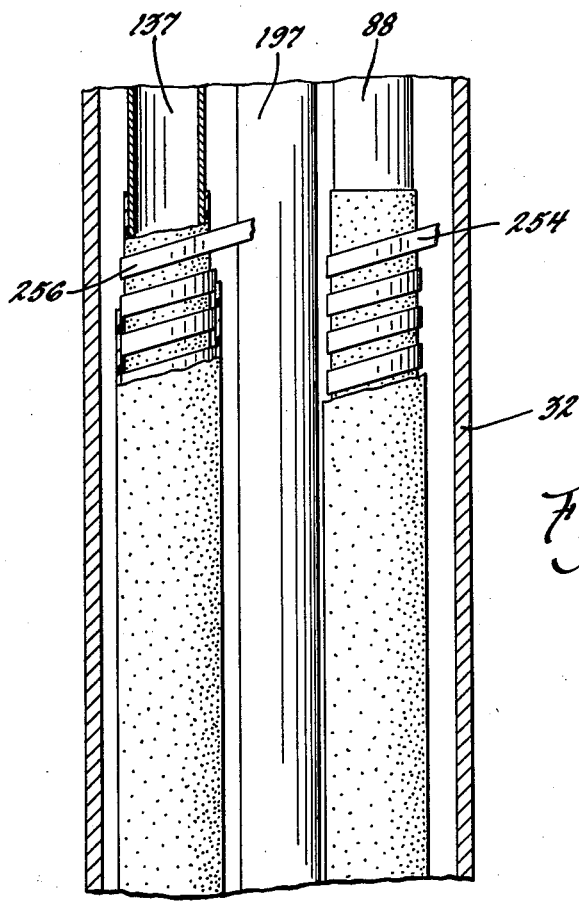

April 14, 1964 P. F. SHAEFFER 3,128,995
PORTABLE MIXING MACHINE
Filed Sept. 30, 1960 8 Sheets-Sheet 7

INVENTOR.
Paul F. Shaeffer
BY
Carl A. Stickel
HIS ATTORNEY

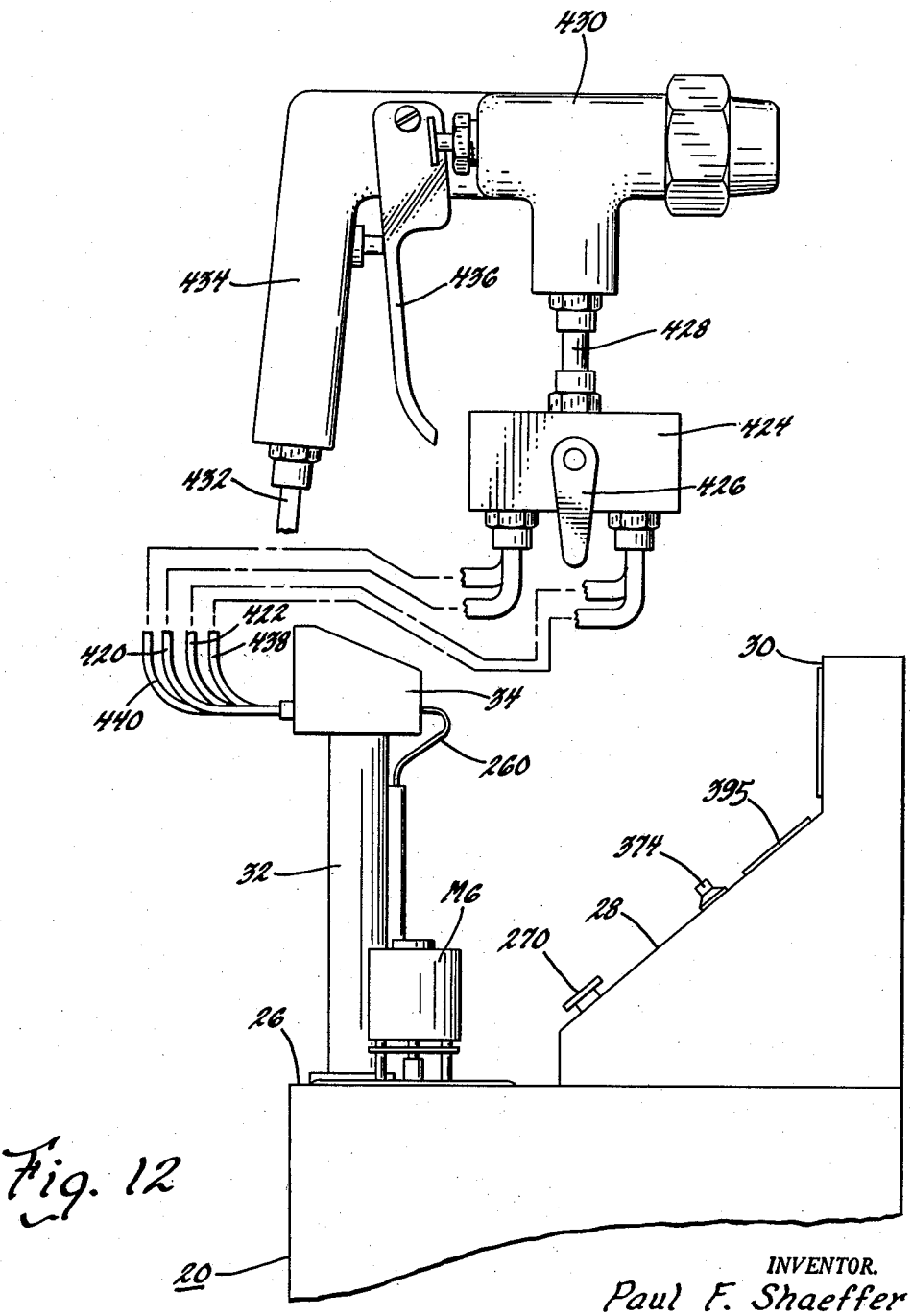

United States Patent Office 3,128,995
Patented Apr. 14, 1964

1

3,128,995
PORTABLE MIXING MACHINE
Paul F. Shaeffer, Lewisburg, Ohio, assignor to General Motors Corporation, Detroit, Mich., a corporation of Delaware
Filed Sept. 30, 1960, Ser. No. 59,618
2 Claims. (Cl. 259—23)

This invention relates to mixing machines for viscous liquids and particularly to a portable mixing machine which will mix viscous liquids, particularly the components of polyurethane foams, accurately with an accurate control of temperature throughout a wide variation of proportions at various rates of delivery.

To obtain optimum results of reactions, the accurate measuring and mixing of viscous liquids is necessary. While in the laboratory and in low production volumes, hand mixing may be used, the slight variations in procedures and techniques because of the human factor may cause differences in result which cannot be accounted for. This is especially true in the formulation of polyurethane foams. Variations in manual procedures occur in the temperature of the fluids, the ratio of the liquid constituents and the quality of mixing. In large scale use, the components of polyurethane foams are processed by an automatic system. Because of this the need arises in laboratories for processing of various formulations to be tested under a similar automatic system to obtain uniformity of conditions for reliable evaluation of the results. Such a machine is also needed for small production volumes.

It is an object of this invention to provide a portable mixing machine which will mix various selected viscous liquids with a variation of less than plus or minus 1% in various selected proportions at various selected rates of delivery without contamination under all foreseeable conditions of use.

It is another object of this invention to provide a portable mixing machine capable of fulfilling the exacting requirements for the proper mixing and delivery of all the various types of polyurethane foams.

It is another object of this invention to provide a portable mixing machine for mixing the ingredients of and delivering with an accuracy of plus or minus 1% polyurethane foam in a wide varation of selected properties at various selected rates of delivery without contamination under all foreseeable conditions of use.

These and other objects are attained in the forms shown in the drawings in which the portable mixing apparatus is housed in a cabinet containing in its top two supply containers each provided with sealed lids on the underside of which is a desiccant container for removing any moisture from the contents thereof. A positive displacement pump is connected to the bottom of each of the supply containers and each is individually driven by an accurate adjustable speed control motor. The pumps each discharge through individual supply contents to a mixing head provided with a dual two-way valve which in operation discharges into a mixing head provided with a flat blade agitator rotated at high speed by an adjustable speed motor. When not delivering to the mixing chamber, the dual two-way valve returns the two liquid components through return conduits provided with individual pressure regulating valves. The supply containers may be cooled as desired by a dual parallel circuit type refrigerating system in which either circuit may be shut off and in which either circuit may have its temperature separately regulated. The system operates continuously in normal operation. The temperature of the components supplied to the mixing head are individually thermostatically controlled by separate electrical heaters wrapped around each

2 of the supply conduits and each controlled by an adjustable thermostatic control responsive to the temperature of the corresponding component between the heaters and the mixing head. In a second form for application by spray, the two-way valve feeds to an air gun.

Further objects and advantages of the present invention will be apparent from the following description, reference being had to the accompanying drawings wherein a preferred embodiment of the present invention is clearly shown.

In the drawings:

FIGURE 8 is a fragmentary sectional view of the connector block taken substantially along the line 8—8 of FIGURE 1.

FIGURE 9 is a fragmentary vertical sectional view of the supply post taken substantially along the line 9—9 of FIGURE 2.

FIGURE 12 is a fragmentary side view showing a modification incorporating an air gun delivery arrangement.

Figure 1:
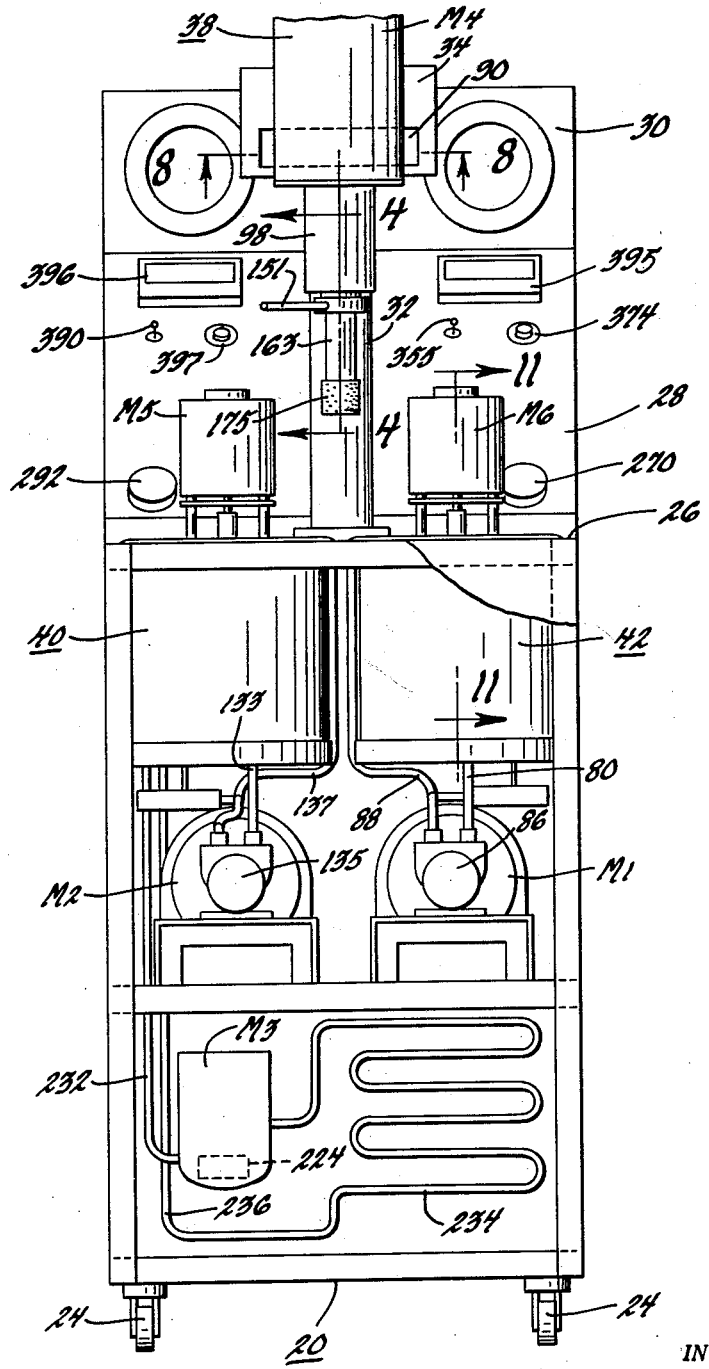
FIGURE 1 is a front view of a portable mixer with the front panels removed embodying one form of my invention.
Figure 2:
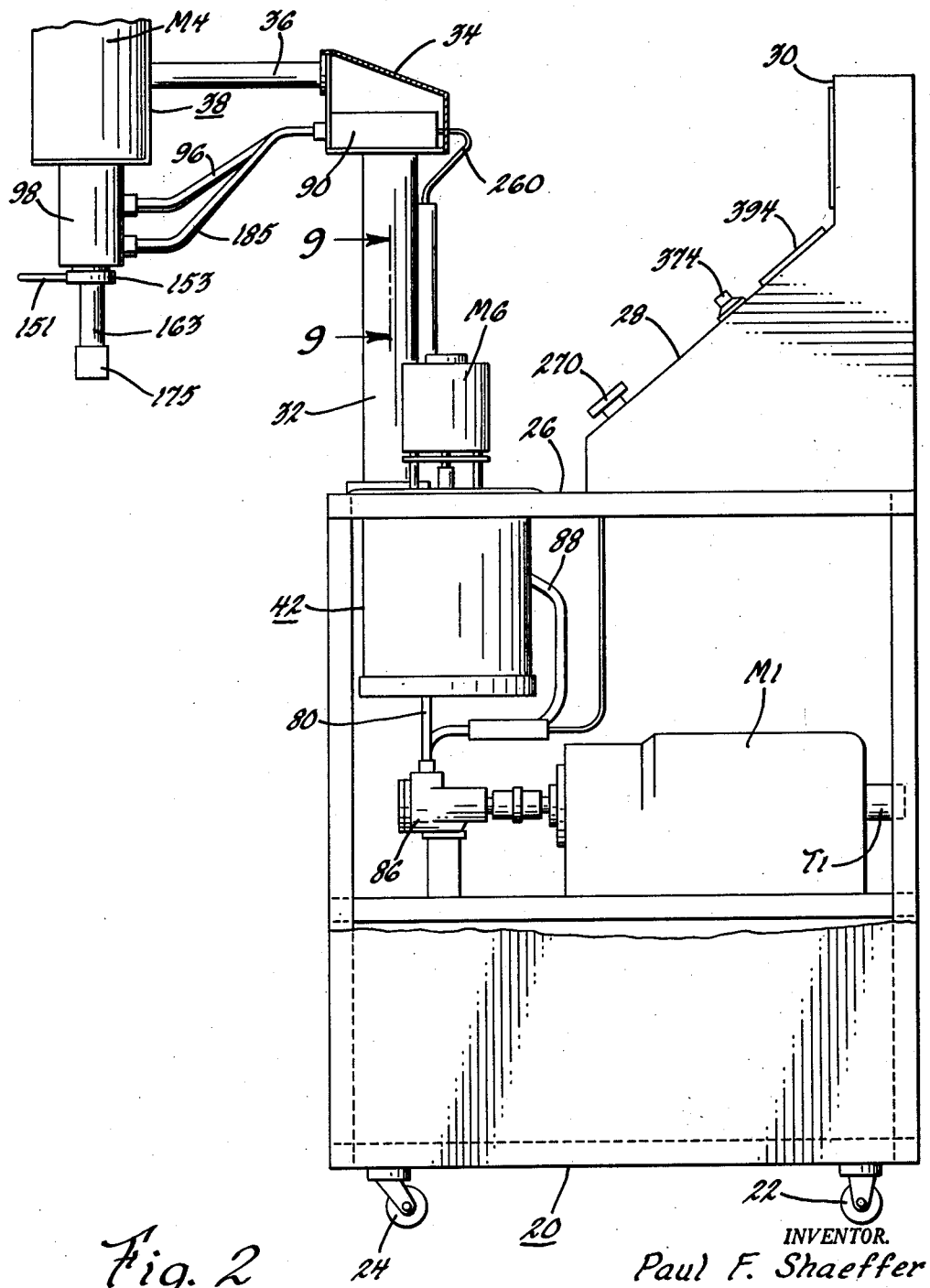
FIGURE 2 is a side view of the mixer shown in FIGURE 1 with part of the side wall broken away.

Referring now to the drawings, and more particularly to FIGURES 1 and 2, there is shown a portable cabinet 20 mounted upon the casters 22 and 24. The portable cabinet includes a suitable rectangular frame provided with removable front, side and rear panels. The top 26 is provided in its rear portion with a sloping instrument panel 28 and a vertical instrument panel 30 behind the sloping panel 28. In the center portion of the top 26 adjacent to the front, there extends upwardly a hollow supporting post 32 provided at the top with a box-shaped bracket 34 connecting the hollow post 32 with a cantilever tubular arm 36 which supports the mixing head 38 forwardly of the cabinet 20.

At the front beneath the top 26 are two supply container assemblies 40 and 42. As shown more particularly in FIGURE 11, each of these supply container assemblies such as the assembly 42 is provided with an outer cylindrical container 44. Within this outer cylindrical container 44 is an inner container 46 of stainless steel having a substantially spherical bottom 48. The inner container 46 is connected to the outer container 44 by an annular yoke 50 fastened by the screws 52 to the top 26 which also holds the clamping ring 54 for the lid 56 of the inner container 46. The lid 56 has a bayonet slot arrangement with the clamping ring 54 so that the seal 58 is compressed between the edges of the lid 56 and the mouth of the inner container 46 to form an airtight seal.

On the bottom side of the lid 56 is formed a perforated container 60 of stainless steel which contains a suitable desiccant such as anhydrous calcium sulphate. After the lid is closed, the anhydrous calcium sulphate within the perforated container 60 absorbs any moisture from the air or any of the contents of the container 46. This is essential in the manufacture of certain types of polyurethane foams. To prevent the formation of excessive vacuum within the inner container 46, there is provided a bleeder pipe 62 extending downwardly through the lid into the top of the perforated container 60 which is provided with a manually operable valve 64. The opening of this valve 64 allows external air to flow through the lid 56 into the desiccant so that the desiccant removes any moisture from the air as it flows into the interior of the container 46 to minimize any vacuum therein.

Within the inner container 46 there is mounted an agitator 66 of the propeller type upon the bottom of a shaft 68 extending downwardly from a sealed bearing 70 in the center of the lid 56. This shaft 68 is connected by a coupling 72 to the drive shaft of an electric motor M6 mounted upon four posts 76 on top of the lid 56. This motor M6 has a speed of 1550 r.p.m. providing an adequate amount of turbulence for the contents of the inner container 46. The agitator 66 is removable and can be replaced by other types of agitators. Bonded to the outside of the inner container is a refrigerant evaporator coil 78 which has its turns tightly spaced around the lower portion of the container 46 and more widely but uniformly spaced throughout the upper portion of the container. Connected to the bottom of the container is a supply conduit 80 and connected to the side walls of the container 46 adjacent the top thereof is the return conduit 82. Between the containers 44 and 46 there is provided suitable insulation 84 such as polyurethane foam.

Figures 4, 5, 6, 7:
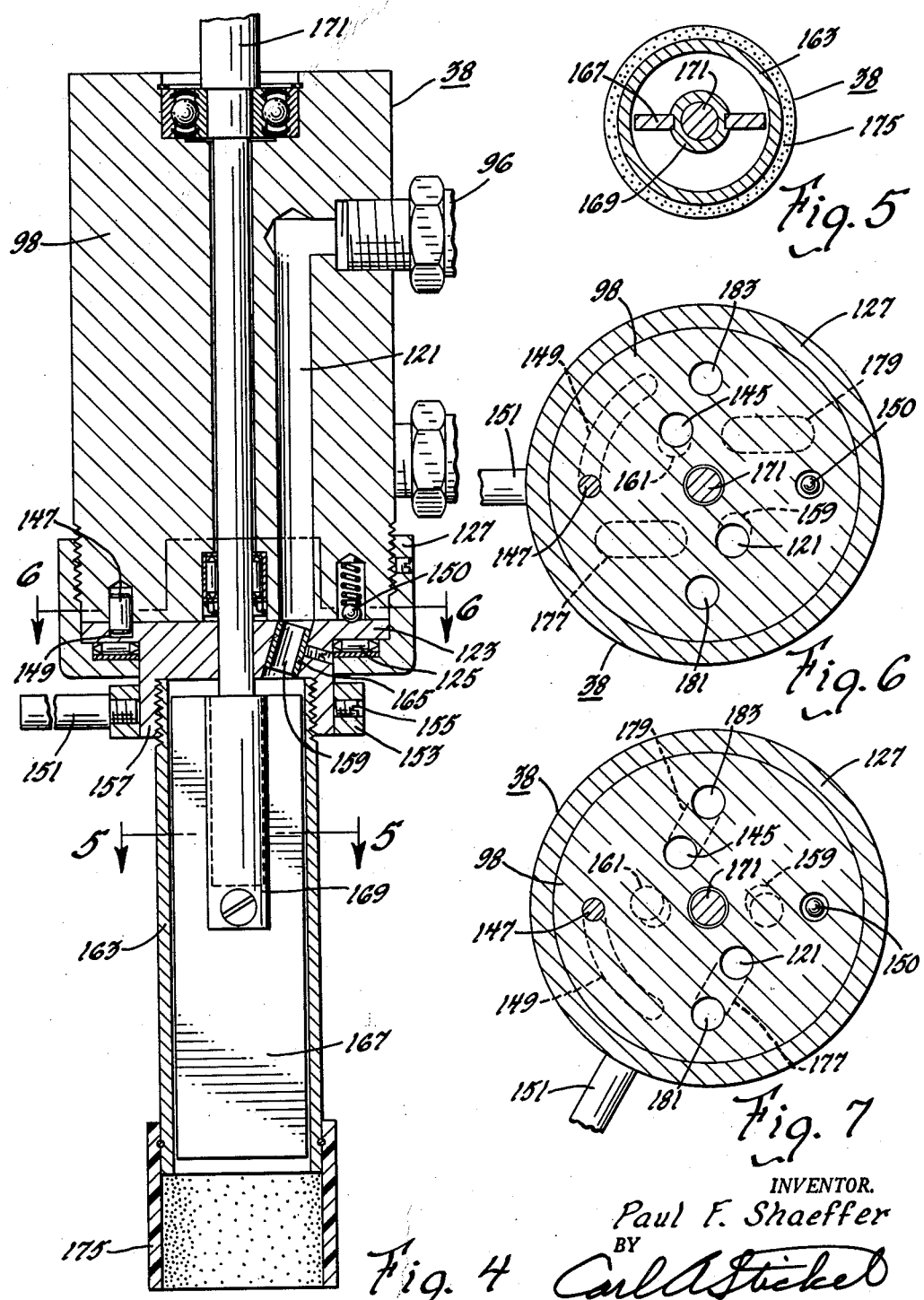
FIGURE 4 is a vertical sectional view of the mixing head taken along the lines 4—4 of FIGURE 1.
FIGURE 5 is a horizontal sectional view of the mixing head taken along the lines 5—5 of FIGURE 4.
FIGURE 6 is a horizontal sectional view of the mixing head taken along the lines 6—6 of FIGURE 4 with the handle and the valve member in the delivering position.
FIGURE 7 is a horizontal sectional view of the mixing head similar to the section shown as 6—6 of FIGURE 4 but with the handle and the valve member in the recirculating position.
Figure 10:
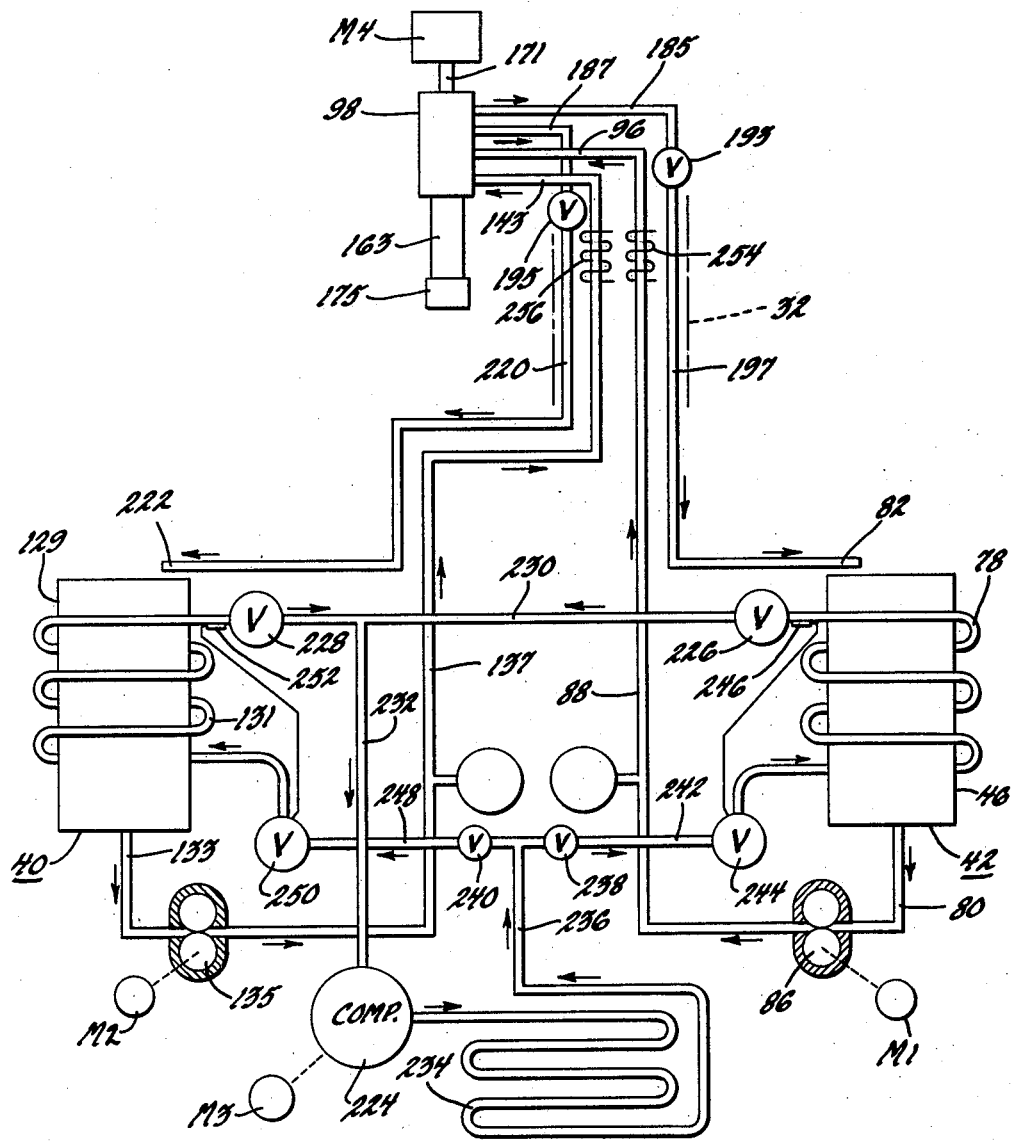
FIGURE 10 is a diagram of the fluid delivery system and the refrigerating system.

The conduit 80, FIGURES 1, 10, extends downwardly to a positive displacement gear within a gear-type pump 86 located beneath the container assembly 42. The outlet of the pump 86 connects to a supply conduit 88 extending upwardly through the hollow post 32 to the connector block 90 located at the top of the post 32. Specifically, the supply conduit 88 connects to the branch conduit 92, FIGURE 8, which connects with the transverse bore 94 having a supply conduit 96 connected at one end which connects to one of the supply inlets in the mixing housing 98. Specifically, this one inlet connects with a downwardly extending passage 121 in the housing 98 as shown in FIGURE 4. Bearing 127 is locked by a set screw.

Figure 11:
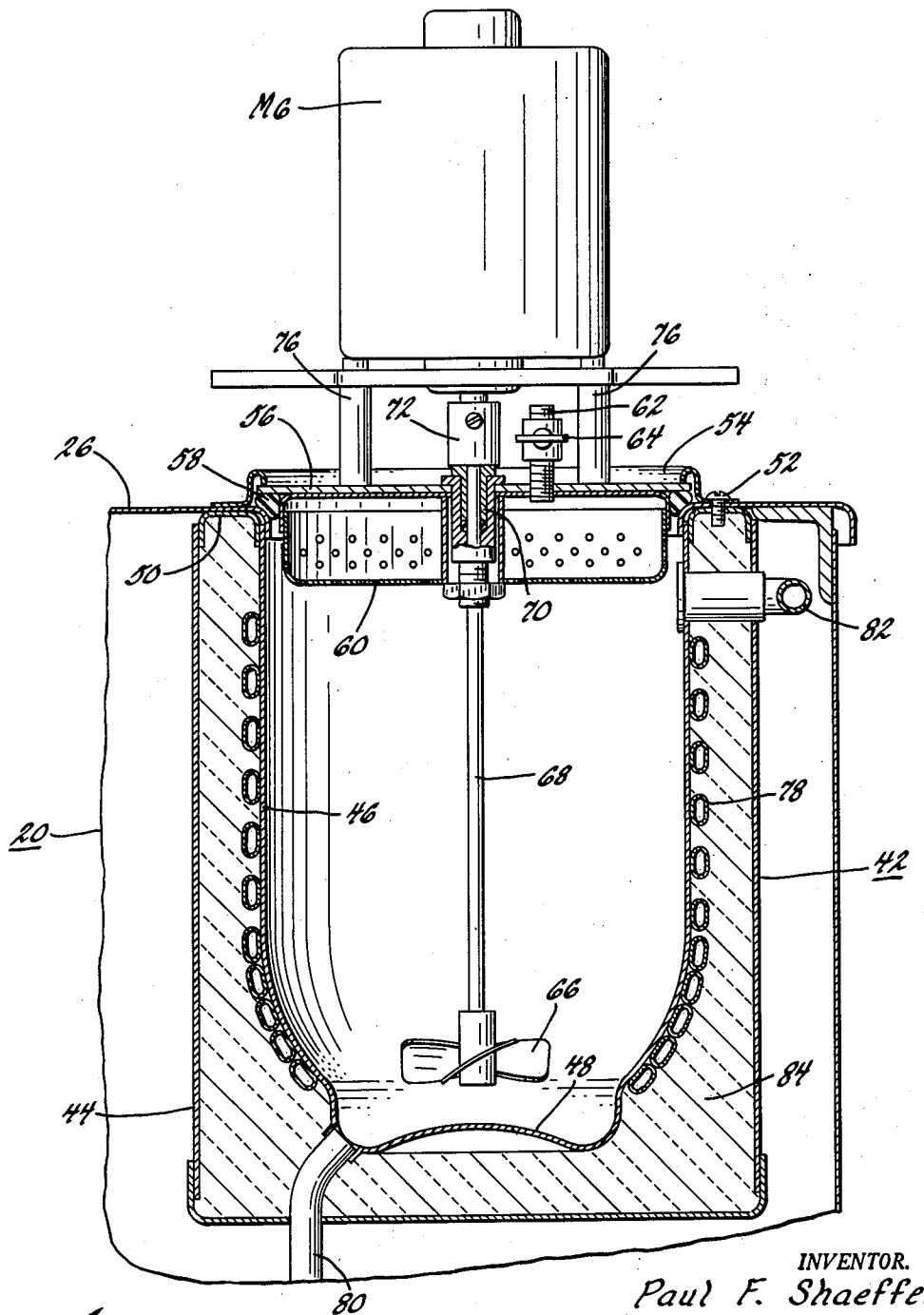
FIGURE 11 is a fragmentary vertical sectional view of one of the supply containers taken along line 11—11 of FIGURE 1.

The container assembly 40 also includes an inner container 129 which may be identical to the container 46 and similarly surrounded and bonded to a refrigerant evaporator coil 131. It is equipped in identical fashion to the assembly as shown in FIGURE 11. The outlet of this inner container 129 extends through a conduit 133 to the inlet of a positive displacement gear within a gear type pump 135. The outlet of the pump 135 connects to the supply conduit 137 which extends upwardly through the hollow post 32 and connects with the branch passage 139 in the connector block 90. This branch passage connects with the horizontal bore 141 connecting with the supply conduits 143, in turn, connecting with the second supply inlet of the mixer housing. The connecting conduit 143 connects with a downwardly extending passage 145 in the mixer housing 98, leading to the top surface of the valve. The mixer housing 98 is provided with a pin 147 extending down into an arcuate slot 149 for limiting the rotation of the two position valve plate 123 relative to the housing 98. The housing 98 is also provided with a spring and ball detent 150 for engaging suitable notches in the valve plate 123 when the slot 149 is or has its opposite ends in engagement with the pin 147 as shown in FIGURES 6 and 7. The handle 151 connects to a ring 153 fastened by a set screw 155 to the reduced lower portion of 157 of the valve plate which extends through the center of the threaded inwardly flanged ring 127. This handle 151 is used to move the valve plate 123 to and from the recirculating position indicated in FIGURES 6 and 7.

In the delivery position shown in FIGURE 6, the passages 121 and 145 are registered with the passages 159 and 161 which extend through the valve plate 123 into the mixing chamber which is formed by the metal tube 163 which is threaded into the bottom portion 157 of the valve plate 123. Each of these passages includes a bushing 165 held in place by a set screw. Within the mixing sleeve 163 is a long flat blade agitator 167 having the edges of its blade extending close to the interior surface of the sleeve. The flat blade agitator 167 is connected by a connector 169 to the bottom of the agitator shaft 171 which is rotatably mounted within the mixer housing 98 by a lower needle bearing and an upper ball bearing. At its upper end it connects to the motor M4. This is a 1 H.P. variable speed universal motor capable of speeds from 0 to 10,000 r.p.m. Its speed is controlled by the variable transformer 173. Through this variable transformer 173 and the universal motor M4, any desired speed may be attained and the agitator speed can be adjusted to provide the best possible mixing. A polyethylene tube 175 is connected to the bottom of the sleeve 163 to direct the mixed constituents to the place of usage.

When it is not desired to supply the constituents to a place of usage, the handle 151 is turned to the recirculating position shown in FIGURE 7. In this position, the slots 177 and 179 in the valve plate 123 respectively connect the passages 121 and 145 with the upwardly extending passages 181 and 183 in the mixer housing 98. These passages 181 and 183 connect with conduits 185 and 187 connecting with the passages 189 and 191 in the connector block 90. An adjustable restriction valve 193 is provided in the passage 189 and a similar adjustable restriction valve 195 is provided in the passage 191 to insure that the supply and the above described portions of the return conduit will be kept filled with the components of the mixture. The opposite end of the passage 189 connects to a conduit 197 extending through the post 32 to the return connection 82 with the container assembly 42. The opposite end of the passage 191 connects to a conduit 220 likewise passing through the hollow post 32 and to the return conduit connection 222 with the supply tank assembly 40.

The temperature of the system is controlled first by a refrigerating system including a refrigerant compressor 224 driven by the motor M3 for withdrawing refrigerant through the outlet regulating valve 226 in series with the outlet of the evaporator coil 78 of the tank assembly 42 and the outlet regulating valve 228 in series with the outlet of the refrigerant expansion coil 131. These valves are connected together by suction conduits 230 and 232 to the inlet of the compressor 224. The compressor 224 discharges into a condenser 234 which in turn discharges into a supply conduit 236 connecting with the two shut-off valves 238 and 240. The valve 238 is connected by the conduit 242 to the thermostatic expansion valve 244 which is controlled in part by the thermostat bulb 246 located at the outlet of the evaporator 78. This expansion valve 244 has its outlet connecting with the inlet of the evaporator coil 78. Similarly, the outlet of the valve 240 connects through the conduit 248 to the expansion valve 250, also controlled by a thermostat bulb 252 upon the outlet of the evaporator coil 131. The outlet of the valve 250 connects with the inlet of the evaporator coil 131. All of the valves of the refrigerating system are adjustable and the valves 238 and 240 may be closed to prevent the supply of refrigeration to either evaporator. The expansion valves 244 and 250, as well as the suction line flow regulating valves 226 and 228 may be adjusted to maintain the evaporator 78 and 131 and to maintain the inner containers 46 and 129 at any desired temperature below room temperature such as a low limit of 50° F.

To further provide temperature control and for raising the temperature of one of the constituents of the mixture there is provided a ribbon electric heater 254 in heat transfer relation with the supply conduit 88 within the post 32. Similarly, there is also provided a ribbon heater 256 in heat transfer relation with the supply conduit 137. For controlling the heater 254, the passage 94 in the block 90 is provided with a thermostat bulb 258 connected by a capillary tube 260 to the adjustable thermostat switch and indicator 262, shown diagrammatically in FIGURE 3 and provided with an adjusting knob 264 for controlling its operating temperature. This switch controls the relay 266 having a double pole contact arrangement in which one contact controls the indicator lamp 268 and the other contact controls the supply of energy to the variable transformer 270 which in turn controls the supply of energy to the ribbon heater 254. The variable transformer 270 is adjusted to adjust the heating rate of the heater 254 so as to maintain the desired temperature with a minimum of cycling. A switch 272 controls the supply of energy to this heater and control unit from the supply conductor 274. A pilot light 276 is also connected in series with the switch 272.

A thermostat bulb 278 is also provided in the passage 141 connected by the capillary tube 280 to the adjustable thermostatic switch and indicator 282. The switch 282 is provided with an adjusting knob 284 for adjusting the temperature at which the heater 256 maintains the fluid in the passage 141. A switch 286 controls the flow of energy to the control circuits for the heater 256. The thermostatic switch 282 controls the double pole relay 288 for controlling the supply of energy to the pilot light 290 and to the variable transformer 292 which is used to adjust the heating rate of the heater 256 to maintain the temperature selected with a minimum of cycling. Each of these heater systems is capable of raising the temperature to and maintaining the temperature at any selected level up to 140° F.

Figure 3:
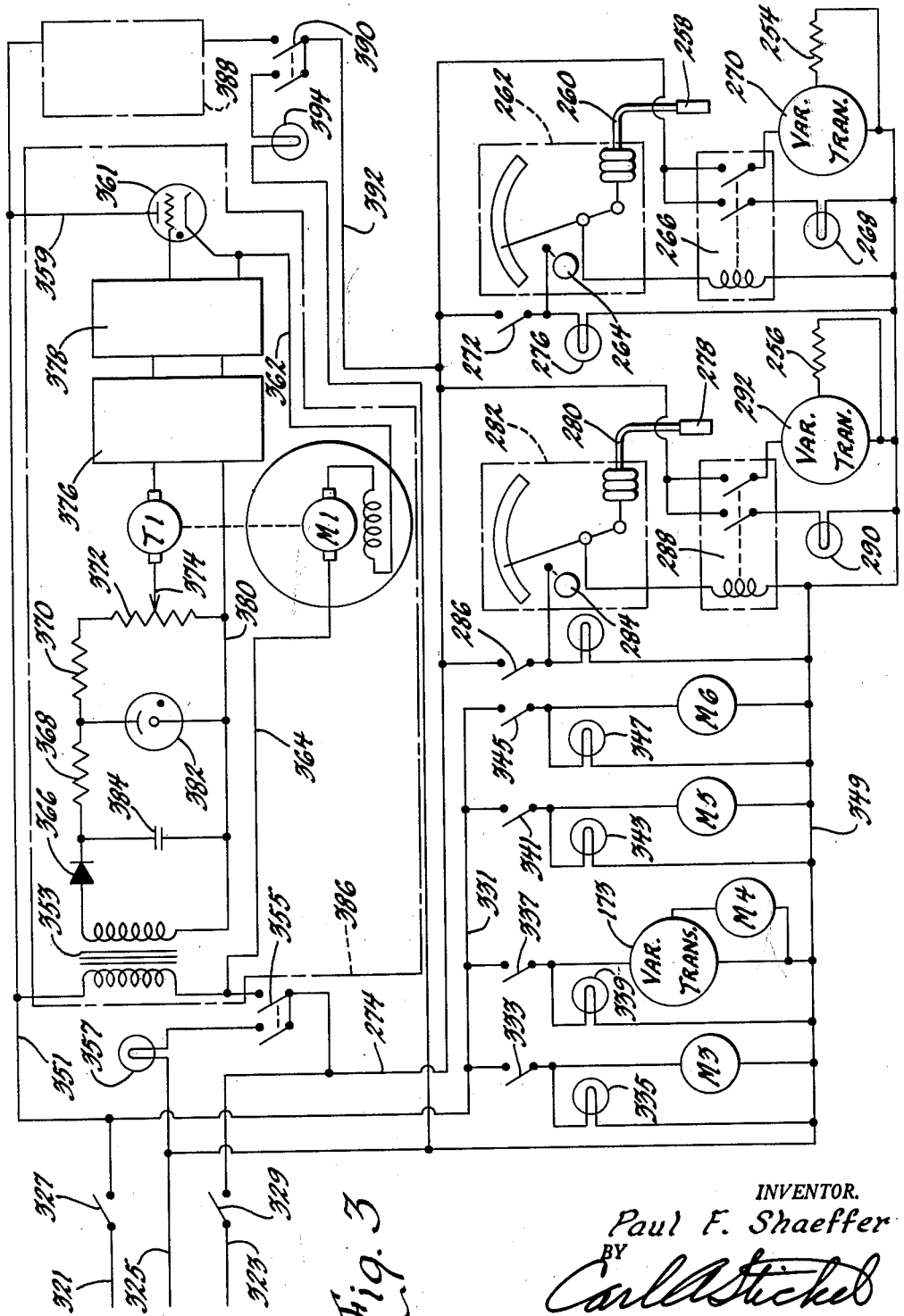
FIGURE 3 is a wiring diagram for the mixer shown in FIGURES 1 and 2.

To provide delivery of the mixture at any desired rate and at any desired stoichiometric ratio accurately throughout the delivery of the batch, a separate adjustable constant speed drive system is provided for each of the pumps 86 and 135. The pump 86, for example, is driven by a geared A.C. series type motor M1. The pump 135 is driven by a geared A.C. series type motor M2. The electrical systems shown in FIGURE 3 illustrate the type of electrical control of these motors which accomplishes the adjustable speed which is maintained constantly and accurately under fluctuating loads and supply voltage. The electrical supply includes two outer supply conductors 321 and 323 providing a supply of 230 volts and a central neutral conductor 325 providing a voltage of 115 volts between it and the conductors 321 and 323. The switches 327 and 329 control the connection of the circuits within the cabinet 20 to the supply conductors 321 and 323. The switch 327 connects to the supply conductor 331 which connects through the switch 333 with the compressor motor M3 and its signal light 335. The switch 337 connects the conductor 331 to the pilot light 339 and the variable transformer 173 which controls the agitator motor M4. The switch 341 connects the supply conductor 331 to the pilot light 343 and the motor M5 which drives the agitator in the tank assembly 40. The switch 345 connects the supply conductor 331 to the pilot light 347 and the motor M6 which drives the agitator 66 in the tank assembly 42. The opposite terminals of these motors and these pilot lights connect to the conductor 349, in turn connecting with the neutral supply conductor 325.

The switch 327 also connects to the supply conductor 351 which connects to one terminal of the transformer 353. This is a voltage regulating transformer and has its second terminal connected through the double pole switch 355, the conductor 274, and the switch 329 to the second supply conductor 323. The double pole switch 355 also energizes the indicator light 357.

The supply conductor 351 connects to the branch conductor 359 with the plate of a thyratron tube 361. The cathode of this tube 359 is connected through the conductor 362 to one terminal of the A.C. series motor M1. The second terminal of this motor is connected to the branch conductor 364 and through the double pole switch 355 to the branch conductor 274 connecting to the switch 329 and the supply conductors 323. The secondary of the voltage regulating transformer 353 connects through the rectifier tube 366 and the resistors 368 and 370 with one terminal of the adjustable potentiometer 372. The adjustable potentiometer 372 has its adjustable contact 374 connected to one output terminal of the tachometer generator T1 which is directly connected to the drive shaft of the motor M1. The tachometer T1 has its second output terminal connected to one terminal of the D.C. control amplifier 376. This D.C. control amplifier 376 has two connections to the phasing control 378 having one of its terminals connected to the grid of the thyratron tube 361 to advance or retard the conduction time of this tube 361. The second terminal is connected to the conductor 362. The second terminal of the D.C. control amplifier 376 is connected to the conductor 380 which connects with the second terminal of the secondary coil of the regulating transformer 353. A cold cathode gas-filled, glow-discharge type voltage regulating tube 382 has one terminal connected to the conductor 380 and its second terminal connected between the resistances 368 and 370. A capacitor 384 also has one terminal connected to the conductor 380 and the second terminal connected between the rectifier tube 366 and the resistance 368.

The speed of the motor M1 is varied by varying the position of the movable contact 374 of the potentiometer 372. Such a speed as selected is maintained constant by the circuit and the elements provided therein contained within the dot-dash outline designated by the reference character 386. In maintaining the speed constant, the voltage signal from the tachometer T1 is compared with the reference voltage provided by the voltage regulating tube 382, the capacitor 384, the transformer 353, and the D.C. control amplifier 376. This reference voltage is connected to oppose the polarity of the tachometer output and any difference in their values becomes an error voltage in the closed loop shown, which is called a velocity servo. Any error or differential voltage is amplified by the D.C. control amplifier 376 and through the phasing control 378 is used either to advance or retard the conduction time of the thyratron tube 361 through its connection with the grid thereon. The change in the output of the thyratron tube causes a change in the speed of the motor M1 to correct any undesired variation.

With this arrangement, variations in the load torque or voltage over a period of time can be held to a variation of less than .5 of a percent of the rated speed. The dot and dash outline 388 indicates a similar wiring diagram and control system like that included within the dot and dash outline 386 for the motor M2 which is included therein. It has one terminal connected to the supply conductor 351 and a second terminal connecting through the double throw switch 390 and the branch conductor 392 with the conductor 274 connecting through the switch 329 with the supply conductor 323. An indicating light 394 is also controlled by the double throw switch 390. The tachometer T1 is also connected to a speed meter 395 for indicating the speed of the motor M1. A similar meter 396 is connected to the tachometer for the motor M2 to indicate its speed. The speed adjustment for the motor M2 is indicated by the reference character 397.

In the form shown in FIGURE 12, there extends from the block 90 within the bracket 34 two supply conduits preferably made of flexible material such as polyethylene 420 and 422 connect with the dual two-way valve 424 which has a manual recirculating control lever 426 controlling the flow of mixed fluids from the supply conduits 420 and 422 through two separate discharge conduits 428 only one being visible because they are aligned into the air gun 430. Air under pressure is supplied through the conduit 432 to the handle 434 of the gun which conducts the air and the two components separately to the nozzle of the gun 430. The flow of air is controlled by the pistol grip type of operating lever 436. The handle 426 may be operated to shut off the flow of the mixer to the gun 430 and to cause the components to be returned to the return conduits 438 and 440 in a manner similar to that shown in FIGURES 1 to 11. The two components supplied to the nozzle of the gun 430 are mixed by the blast of air as they issue from the nozzle and are blown onto any surfaces or into any cavity by the force of the air accompanying the mixed components.

While the embodiment of the present invention as herein disclosed, constitute a preferred form, it is to be understood that other forms might be adopted.

What is claimed is as follows:

1. Mixing apparatus including a plurality of supply containers adapted to contain different liquids, refrigerant evaporating means associated with one of said containers, means including refrigerant liquefying means operatively connected to said evaporating means for keeping said evaporating means at a substantially constant temperature, a mixer housing, supply and return conduit means extending from said supply containers to said mixer housing, valve means associated with said mixer housing for connecting said supply conduit means with said return conduit means or for delivery into said mixer housing, positive displacement pump means located in each of said supply conduit means for pumping liquids individually from said supply containers to said valve means, the supply conduit means connected with said one container being provided with electric heating means, a variable transformer and a thermostatic control means for controlling said heating means having a thermosensitive element in heat transfer with the liquid in said supply conduit means between said heating means and said valve means for delivering liquid at a substantially constant temperature to said mixer housing.

2. Mixing apparatus including a plurality of supply containers adapted to contain different liquids, refrigerant evaporating means associated with one of said containers, means including refrigerant liquefying means operatively connected to said evaporating means for keeping said evaporating means at a substantially constant temperature, a mixer housing, supply and return conduit means extending from said supply containers to said mixer housing, two position valve means associated with said mixer housing for alternately connecting said supply conduit means solely with said return conduit means or solely for delivery directly into said mixer housing, positive displacement pump means located in each of said supply conduit means for pumping liquids individually from said supply containers to said valve means, the supply conduit means connected with said one container being provided with electric heating means, a thermostatic control means for said heating means having a thermosensitive element in heat transfer with the liquid in said supply conduit means between said heating means and said valve means for delivering liquid at a substantially constant temperature to said mixer housing, and a variable restriction located in each of said return conduit means for assuring quick delivery from said supply conduit means to said mixer housing upon operation of said valve means.

References Cited in the file of this patent

UNITED STATES PATENTS

| | | |
|---|---|---|
| 1,895,601 | Beuthner | Jan. 31, 1933 |
| 2,491,656 | Goldman | Dec. 20, 1949 |
| 2,591,055 | Dietert et al. | Apr. 1, 1952 |
| 2,685,436 | Hasselquist | Aug. 3, 1954 |
| 2,721,729 | Van Riper | Oct. 25, 1955 |
| 2,724,581 | Pahl et al. | Nov. 22, 1955 |
| 2,779,689 | Reis | Jan. 29, 1957 |
| 2,802,648 | Christensen et al. | Aug. 13, 1957 |
| 2,847,196 | Franklin et al. | Aug. 12, 1958 |
| 2,868,518 | Corby et al. | Jan. 13, 1959 |
| 2,905,448 | Martinek | Sept. 22, 1959 |
| 2,958,516 | Wall et al. | Nov. 1, 1960 |
| 2,974,830 | Hood | Mar. 14, 1961 |